United States Patent [19]

Kayama

[11] 4,357,835

[45] Nov. 9, 1982

[54] ELECTROMAGNETIC FLOWMETER IN SHIELDED LINES

[75] Inventor: Nagaoki Kayama, Tokyo, Japan

[73] Assignee: Hokushin Electric Works, Ltd., Tokyo, Japan

[21] Appl. No.: 161,430

[22] Filed: Jun. 20, 1980

[51] Int. Cl.³ ............................................. G01F 1/60
[52] U.S. Cl. ................................................ 73/861.17
[58] Field of Search ........... 73/861.12, 861.14, 861.16, 73/861.17

[56] References Cited

U.S. PATENT DOCUMENTS

| | | | |
|---|---|---|---|
| 3,491,593 | 1/1970 | Bailey | 73/861.16 |
| 3,783,687 | 1/1974 | Mannherz et al. | 73/861.17 |
| 3,902,366 | 9/1975 | Gruner | 73/861.16 |
| 3,999,443 | 12/1976 | Appel et al. | 73/861.17 |
| 4,206,640 | 6/1980 | Suzuki | 73/861.16 |

Primary Examiner—Charles A. Ruehl
Attorney, Agent, or Firm—Michael Ebert

[57] ABSTRACT

An electromagnetic flowmeter in which the fluid whose flow rate is to be measured is conducted through the flow tube of a primary provided with a pair of diametrically-opposed electrodes to intercept a magnetic field established by an electromagnet whose coil is excited by a current having a rectangular waveform whose frequency is low relative to that of a commercial a-c power line. The electrodes of the primary are connected through a transmission line to the input amplifiers of a secondary, the transmission line being constituted by a pair of shielded cables each including an inner line connecting an electrode to the input of a respective amplifier and an outer shield connected to the output of the amplifier, the cables being surrounded by a common outer shield.

7 Claims, 6 Drawing Figures

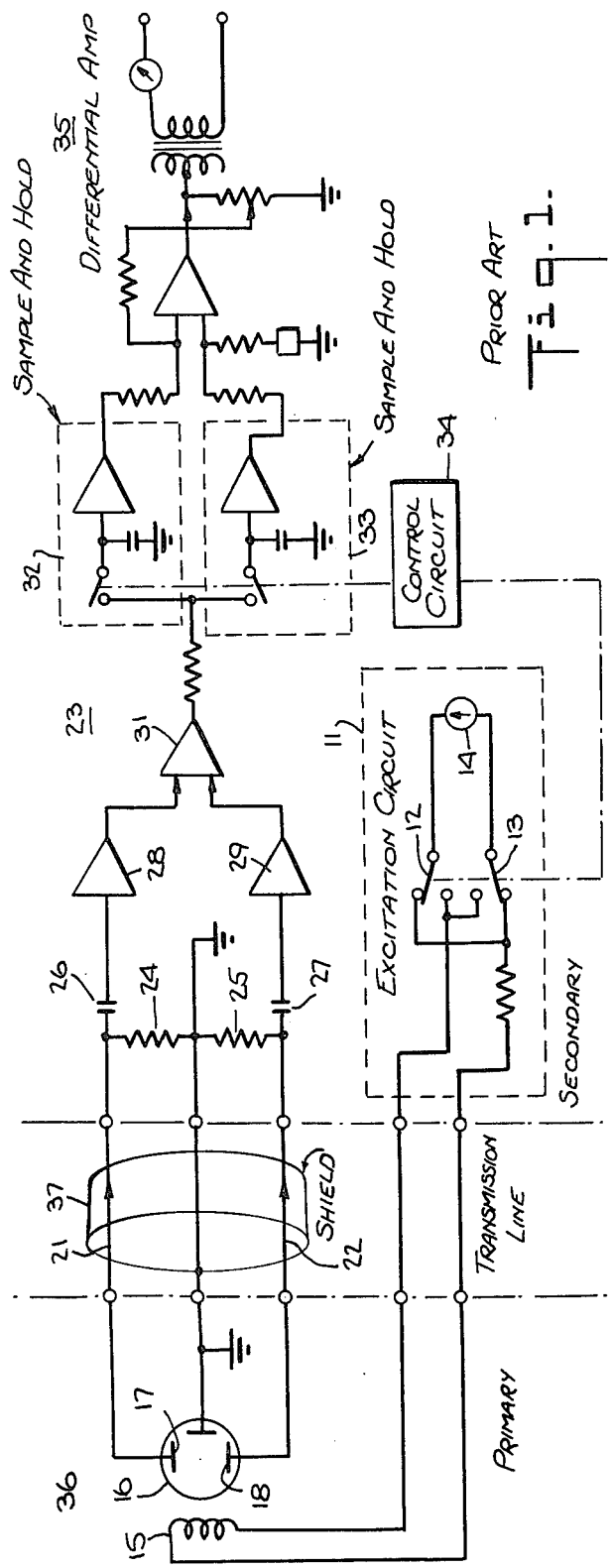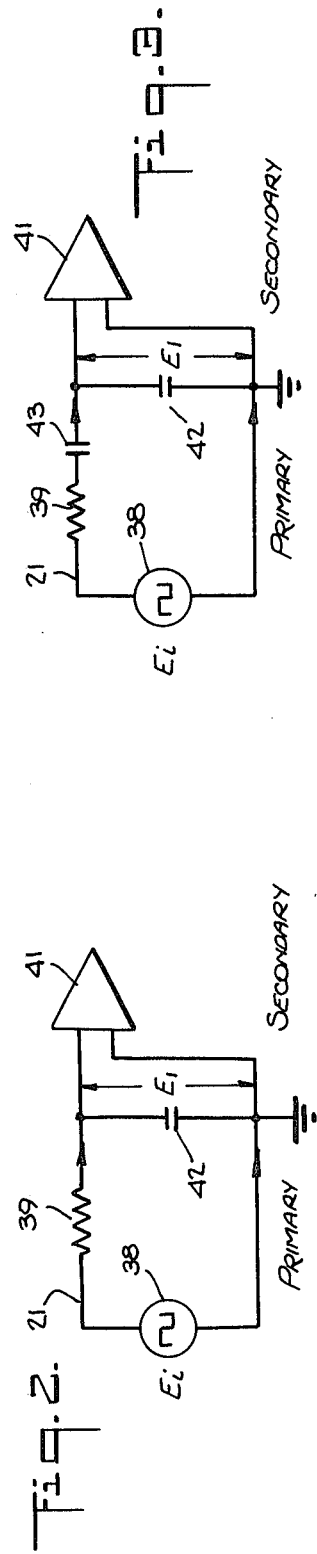

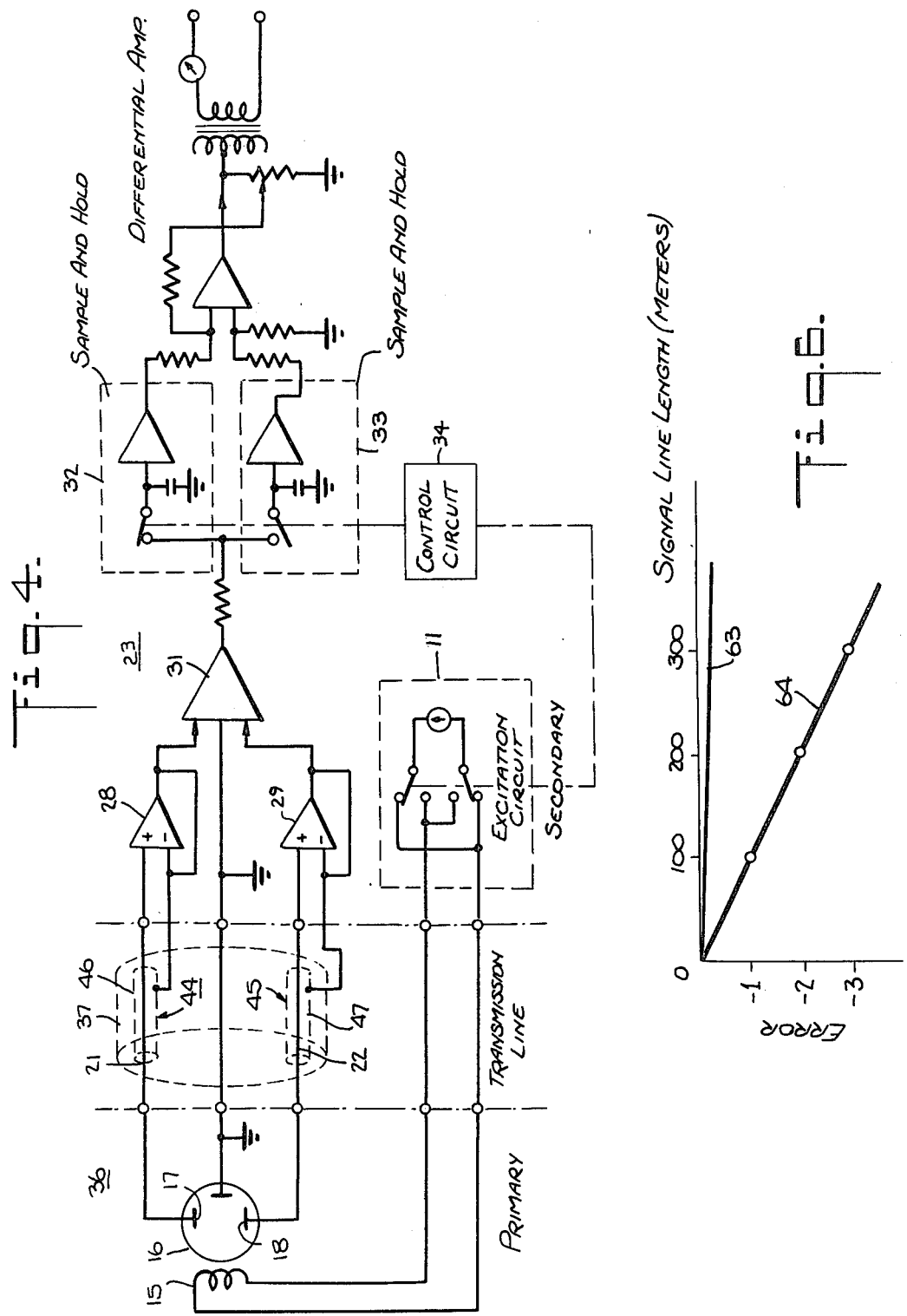

ELECTROMAGNETIC FLOWMETER IN SHIELDED LINES

BACKGROUND OF INVENTION

This invention relates to electromagnetic flowmeters wherein excitation current for the electromagnetic coil is a periodic wave whose frequency is lower than the frequency of a commercial a-c power line.

In an electromagnetic flowmeter, the liquid whose flow rate is to be measured is conducted through the flow tube of a primary provided with a pair of diametrically-opposed electrodes, a magnetic field perpendicular to the longitudinal axis of the tube being established by an electromagnet. When the flowing liquid intersects this field, a voltage is induced therein which is transferred to the electrodes. This voltage, which is proportional to the average velocity of the liquid and hence to its average volumetric rate, is then amplified and processed in a converter or secondary to actuate a recorder or indicator.

The magnetic field may be either direct or alternating in nature; for in either event the amplitude of voltage induced in the liquid passing through the field will be a function of its flow rate. However, when operating with direct magnetic flux, the D-C signal current flowing through the liquid acts to polarize the electrodes, the magnitude of polarization being proportional to the time integral of the polarization current. With alternating magnetic flux operation, polarization is rendered negligible, for the resultant signal current is alternating and therefore its integral does not build up with time.

Though A-C operation is clearly advantageous in that polarization is obviated and the A-C flow-induced signal may be more easily amplified, it has distinct drawbacks. The use of an alternating flux introduces spurious voltages that are unrelated to flow rate and, if untreated, give rise to inaccurate indications. The two spurious voltages that are most troublesome are:
1. stray capacitance-coupled voltages from the coil of the electromagnet to the electrodes, and
2. induced loop voltages in the input leads. The electrodes and leads in combination with the liquid extending therebetween constitute a loop in which is induced a voltage from the changing flux of the magnetic coil.

The spurious voltages from the first source may be minimized by electrostatic shielding and by low-frequency excitation of the magnet to cause the impedance of the stray coupling capacitance to be large. But the spurious voltage from the second source is much more difficult to suppress.

The spurious voltage resulting from the flux coupling into the signal leads is usually referred to as the quadrature voltage, for it is assumed to be 90° out of phase with the A-C flow-induced voltage. Actual tests have indicated that this is not true in that a component exists in-phase with the flow-induced voltage. Hence, that portion of the "quadrature voltage" that is in-phase with the flow-induced voltage signal constitutes an undesirable signal that cannot readily be distinguished from the flow-induced signal, thereby producing a changing zero shift effect.

Pure "quadrature" voltage has heretofore been minimized by an electronic arrangement adapted to buck out this component, but elimination of its in-phase component has not been successful. Existing A-C operated electromagnet flowmeters are also known to vary their calibration as a function of temperature, fluid conductivity, pressure and other effects which can alter the spurious voltage both with respect to phase and magnitude.

Hence it becomes necessary periodically to manually re-zero the meter to correct for the effects on zero by the above-described phenomena.

All of the adverse effects encountered in A-C operation of electromagnetic flowmeters can be attributed to the rate of change of the flux field $(d\phi)/dt$, serving to induce unwanted signals in the pick-up loop. If, therefore, the rate of change of the flux field could be reduced to zero value, then the magnitude of quadrature and of its in-phase component would become non-existent. Zero drift effects would disappear.

When the magnetic flux field is a steady state field, as, for example, with continuous D-C operation, the ideal condition $d\phi/dt 32\ 0$ is satisfied. But, as previously noted, D-C operation to create a steady state field is not acceptable, for galvanic potentials are produced and polarization is encountered.

It is known with electromagnetic flowmeters to provide low-frequency excitation current to establish an alternating magnetic field, the excitation frequency being lower than the frequency of the commercial power line source so as to improve the zero-point stability of the flowmeter. Thus with a power line frequency of 60 cycles, the excitation frequency may be 15 Hz. The waveform of the excitation frequency may be sinusoidal, triangular, rectangular or in any other periodic form. The rectangular form is now widely used.

In the patent to Mannherz et al., U.S. Pat. No. b 3,783,687, whose entire disclosure is incorporated herein by reference, there is disclosed an electromagnetic flowmeter in which the excitation current for the electromagnetic coil is a low-frequency rectangular wave serving to produce a periodically-reversed steady state flux field, whereby unwanted in-phase and quadrature components are minimized without giving rise to polarization and galvanic effects.

In a low-frequency excitation system of the type disclosed in the Mannherz et al. patent, the electrode signal derived from the primary of the electromagnetic flowmeter is sampled in the secondary during intervals when the magnetic flux is substantially in a steady state condition. Since a drift of the output zero point depends largely on variations in the time differential of the applied magnetic flux, it becomes possible to stabilize the zero point by low-frequency excitation using rectangular magnetic flux and minimizing the time differential value of the magnetic flux by signal detection carried out by the above-noted sampling technique.

It has been found, however, that with an electromagnetic flowmeter having low-frequency excitation, when the distance between the primary of the flowmeter and the secondary thereof is relatively long, as, for example, longer than 100 meters, and when the conductivity of the fluid being metered is low, a transmission error arises due to capacitance encountered in the cable connecting the electrodes of the primary to the input of the secondary or converter. Even when shielded cables are employed, a span error of several percent occurs when the distance between the primary and secondary reaches about 300 meters. This error is attributable not only to stray capacity in the signal line but also to the capacity of the electrical double layer on each electrode. This value of this capacity depends on the electrode's area, its surface condition and the nature of the fluid being metered; hence it is not a constant value.

SUMMARY OF INVENTION

In view of the foregoing, the main object of this invention is to provide an electromagnetic flowmeter whose primary includes an excitation circuit generating a low-frequency rectangular wave excitation current, the primary being coupled by a shielded transmission line to the secondary in a manner which effectively eliminates errors due to the capacity of the electrical double layer on each electrode as well as stray capacitances.

Briefly stated, this object is attained in an electromagnetic flowmeter in which the fluid to be metered is conducted through a flow tube where it intersects the magnetic field established by an electromagnet to induce a voltage therein which is transferred to a pair of electrodes mounted on diametrically-opposed positions in the flow tube, the coil of the electromagnet being excited by a rectangular wave whose frequency is low relative to the frequency of a commercial A-C power line source.

The electrodes of the primary are connected by a transmission line to the respective inputs of the first and second amplifiers of a secondary or converter which includes means to sample the electrode signal in those intervals wherein the magnetic flux of the field is in a steady state condition.

To reduce error as a result of capacitance effects, the transmission line is constituted by first and second shielded cables, each including an inner line and an outer shield, the lines of these cables connecting the electrodes to the respective inputs of the first and second amplifiers whose outputs are connected to the outer shields, the first and second cables being surrounded by a common outer shield.

OUTLINE OF DRAWINGS

For a better understanding of the invention as well as other objects and further features thereof, reference is made to the following detailed description to be read in conjunction with the accompanying drawings, wherein:

FIG. 1 is a schematic diagram of a conventional electromagnetic flowmeter having low-frequency excitation;

FIG. 2 illustrates the equivalent electrical circuit of the conventional flowmeter;

FIG. 3 shows the same equivalent circuit modified to take into account the capacitance of the double layer on each electrode of the flowmeter;

FIG. 4 is a schematic diagram of a first embodiment of an electromagnetic flowmeter which incorporates shielded lines in accordance with the invention;

FIG. 6 is a graph illustrating the relationship between the error and the length of the signal lines.

DESCRIPTION OF INVENTION

Figure 5:
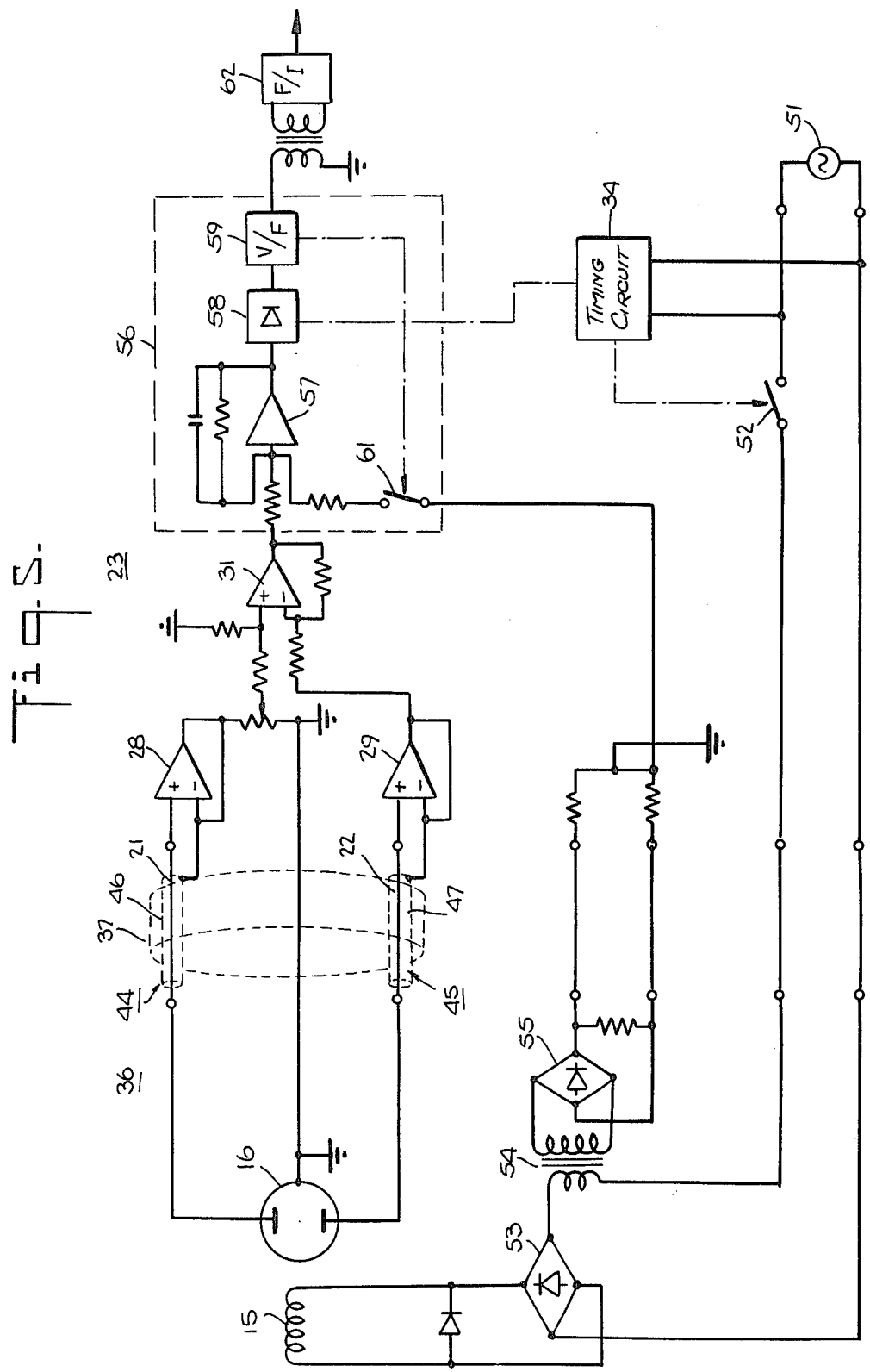
FIG. 5 is a schematic diagram of a second embodiment of an electromagnetic flowmeter in accordance with the invention.

Referring now to FIG. 1, there is shown a conventional electromagnetic flowmeter wherein a low-frequency excitation current is supplied to coil 15 of an electromagnet. To this end, the excitation circuit 11 includes a pair of switches 12 and 13 which are ganged together and are connected to a constant current power supply 14.

These switches are periodically actuated to apply power to the coil in alternate directions to produce a rectangular wave of constant current amplitude, thereby establishing a magnetic flux field in flow tube 16. The wave has a frequency which is lower than that of a commercial power line source; that is, less than 60 or 50 Hz.

The fluid to be metered is conducted through flow tube 16 of the flowmeter primary and intercepts the magnetic field therein to induce a voltage in the fluid which is transferred to a pair of electrodes 17 and 18 mounted at diametrically-opposed positions on the tube. The voltage yielded by electrodes 17 and 18 is supplied via signal lines 21 and 22 of a transmission line to a secondary or converter generally designated by numeral 23. In this converter, signal lines 21 and 22 are grounded via resistors 24 and 25, respectively, the lines also being connected via capacitors 26 and 27 to the respective inputs of a pair of amplifiers 28 and 29 whose outputs are applied to a differential amplifier 31.

The output of amplifier 31 which is the differential of the outputs of amplifiers 28 and 29 is alternately sampled and held by sample-and-hold circuits 32 and 33. The sample-and-hold operations take place during each half period or during each full period of excitation in the interval therein when the magnetic flux of the field is close to its steady state condition. Periodic operation of excitation circuit 11 and of sample-and-hold circuits 32 and 33 at a rate below the power line frequency is effected by a timing circuit 34.

The outputs of sample-and-hold circuits 32 and 33 are applied to a differential amplifier 35 whose output is converted into a D-C signal, preferably in a 4 to 20 Ma range or any other range suitable for transmission in industrial process control applications.

Because the influence of stray capacitance on signal lines 21 and 22 has heretofore been regarded as small in a flowmeter having low-frequency excitation, use has merely been made of a shield 37 common to both lines. That is to say, the prior practice has been to employ a single-shielded transmission line cable between the primary and secondary of the flowmeter. Shield 37 is made equi-potential with respect to flow tube 10; that is, to the line fluid to be metered.

FIG. 2 shows the equivalent circuit of the conventional meter illustrated in FIG. 1. In FIG. 2, element 38 represents the source of voltage $E_i$ induced across electrodes 17 and 18 of the flowmeter primary. This source is connected to input amplifier 41 of the secondary or converter via a resistor 39 which represents the resistance component between the electrodes. The input of amplifier 14 is grounded via a capacitor 42 which represents the capacitive component of signal lines 21 and 22 relative to ground.

Prior to the present invention, the accepted theory was that where the space between electrodes 17 and 18 is sufficiently large as compared with their area "a," the interelectrode resistor 39 is then a pure resistor having a resistance value of $1/(\sigma a)$; where $\sigma a$ is the conductivity of the fluid to be metered. Assuming that R represents the resistance value of resistive component 39 and that C represents the capacitance of the capacitive component of signal lines 21 and 22, and assuming further that S represents a Laplace operator and $E_i$ represents the induced voltage between electrodes 17 and 18, then the input voltage $E_1$ to converter 23 is given by the following equation:

$$E_1 = \frac{1}{1 - RCS} \times E_i \quad \text{(Eq. 1)}$$

If resistance value of resistive component 39 and capacitance C of the shielded cable are selected to be 10 KΩ and 100 pF/m, respectively, then it follows from equation (1) that when the distance of transmission is 300 meters, the transmission error is $-10\%$ (0.1) in the case of excitation using a sine-wave current of a 50 Hz commercial power line source frequency. In the case of low-frequency excitation using a 50/4 Hz sine-wave current, the transmission error is 2.5% (0.025). Thus low-frequency excitation makes it possible to reduce errors resulting from stray capacitance of the cable.

It has been found, however, that these results cannot actually be achieved in practice. The reason for this is that an electrical double layer is formed on the fluid contact surface of each of electrodes 17 and 18. This double layer has a relatively large capacitance value of about 0.1 to 1 μF with respect to ordinary tap water. The capacitance value based on the electrical double layer depends on the electrode area, its surface condition and the kind of fluid to be metered; hence it is not a constant value.

Accordingly, when taking into account capacitive component $C_d$ based on the electrical double layer formed on the fluid contact surface of the electrode, a circuit equivalent to flowmeter primary 36 is that shown in FIG. 3, wherein a capacitor 43 representing the capacitive component based on the electrical double layer effect is connected in series with resistive component 39. As a consequence, the input voltage $E_1$ to secondary 23 is expressed by the following equation:

$$E_1 = \frac{L}{1 + \frac{C}{C_d} + RCS} E_i \quad \text{(Eq. 2)}$$

From a comparison of equations (2) and (1), it will be seen that the former includes the term $C/C_d$ of the error based on capacitance $D_c$ by the electrical double layer. When this error is no longer negligible as compared to the term RCS representing the error caused by resistance R of the signal source and capacitance C of the cable, then the error cannot be sufficiently reduced even if the single-shielded cable is merely used for the low-frequency excitation.

In an experiment involving a flow tube having a 50 cm internal diameter with electrodes 17 and 18 of 5 mm diameter made of stainless steel, the capacitance $C_d$ of the electrical double layer was found to be about 1 μF. Accordingly, if the same values as the numerical values used in equation (1) are substituted in equation (2), $C/C_d$ is $3 \times 10^{-2}$ (0.03) regardless of any of the excitation frequencies 50 Hz, 50/4 Hz and 50/8 Hz, and $RC\omega = 2\pi fRC$ becomes $10^{-1}$ (0.1), 0.025 and 0.0125, respectively corresponding to such frequencies.

In other words, at an excitation frequency of 50/4 Hz, the errors $C/C_d$ and RC are substantially equal to each other; but at 50/8 Hz, the former is approximately 10 times larger than the latter. Thus although the error component due to the cable capacitance C is reduced by low-frequency excitation, the error component due to $C/C_d$ is not decreased. It becomes evident, therefore, that the conventional approach to reducing error fails to achieve its purpose.

It is well known that an electromagnetic flowmeter indicates the mean flow rate of a fluid flowing through the flow tube when it is symmetrical with respect to the center axis of the flow tube. Furthermore, it has been ascertained theoretically and experimentally that an electromagnetic flowmeter responds to flow rate with very high linearity. Accordingly, if stabilization of the zero point can be achieved by the low-frequency excitation, then it would be possible to obtain an electromagnetic flowmeter of high accuracy.

However, even when measuring ordinary tap water, the signal transmission line between the primary and the secondary of the flowmeter is usually as long as about 100 meters; and, as will be seen from equation (2), this line length will give rise to a span error of about several percent. This renders a highly accurate measurement an impossibility. The span can also be forcibly adjusted in accordance with the error by the line length, but this leads to a loss of replaceability between the primary and the secondary; hence this is not the preferred approach for obtaining a highly accurate electromagnetic flowmeter.

FIRST EMBODIMENT

The present invention eliminates errors due to the capacity of the electrical double layer on each electrode and the stray capacity of the signal transmission line in the conventional electromagnetic flowmeter of high accuracy.

In accordance with the present invention, at least the signal lines interconnecting the primary or transmitter of the flowmeter and its secondary or converter pass through respective shielded cables. The line shields are made equipotential with respect to the outputs of the input amplifiers of the converter, these shielded cables being further covered by a common shielded cable, thereby reducing error to a very low percentage value.

Thus as shown in FIG. 4 in which components corresponding to those in FIG. 1 are identified by like reference numerals, the signal lines of the transmission line running between primary 36 and secondary 23 are constituted by a first shielded cable 44 connected between electrode 17 and amplifier 28 and a second shielded cable 45 connected between electrode 18 and amplifier 29. Inner lines 21 and 22 are extending through shielded cables 44 and 45, respectively, are connected to the non-inverted inputs of amplifiers 28 and 29, the outer shields 46 and 47 of shielded cables 44 and 45 being connected to the inverted inputs of amplifiers 28 and 29 and their outputs, thereby holding the output potentials of amplifiers 21 and 22 equal to the potentials of shields 46 and 47.

With such an arrangement, the potential difference between the output side of shielded cables 44 and 45 and the input side of differential amplifier 31 made up of amplifiers 28 and 29 is reduced to zero due to the nature of the differential amplifier. Thus the capacitance between signal line 21 and outer shield 46 of shielded cable 44 and the capacitance between signal line 22 and outer shield 47 of shielded cable 45 are reduced to zero. As a consequence, the term C in equation 2 becomes zero, thereby eliminating the error. Furthermore, shielded cables 44 and 45 are enclosed within common shield 37; hence they are not subject to external induction effects. This arrangement, therefore, permits highly accurate measurements.

SECOND EMBODIMENT

The present invention has been described in connection with FIG. 4 as being applied to a constant-current excitation type of electromagnetic flowmeter. However, the invention is also applicable to an electromagnetic flowmeter of the type in which a square-wave current whose amplitude is not controlled is applied to excitation coil 15. Such an arrangement is shown, by way of example, in FIG. 5, wherein components corresponding to those in FIG. 4 are identified with like reference numerals.

In the illustrated example, a commercial power line source 51 is connected to the input of a full-wave rectifier 53 via a switch 52 controlled by a timing circuit 34. The output of full-wave rectifier 53 is connected to excitation coil 15 of the electromagnetic flowmeter. Connected in series with the input of full-wave rectifier 53 is the primary winding of a current transformer 54 whose secondary is coupled to a rectifier 55.

Rectifier 55 provides, as its rectified output, a so-called comparison voltage which is applied to a divider 56 connected to output differential amplifier 31 of the secondary 23. In the divider, the output from differential amplifier 31 is divided by this comparison voltage. The output from an operational amplifier 57 in divider 56 is subjected to synchronous rectification by a rectifier 58 under the control of timing circuit 34.

The rectified output from rectifier 58 is converted by a voltage-to-frequency converter 59 to a frequency signal. A switch 61 is actuated in accordance with the frequency signal from converter 59, switch 61 periodically supplying the comparison voltage from rectifier 55 to divider 56. The output from divider 56 is converted by a frequency-to-current converter 62 to, for example, a 4 to 20 mA current output, which is then transmitted to a remote indicating, recording or process control station. The arrangement of FIG. 5 achieves replaceability between the primary and secondary of the flowmeter.

In the embodiment shown in FIG. 5, the relationship of error to the length of the signal line is represented graphically by line 63 in FIG. 6. In this same figure, the relationship with respect to the prior art electromagnetic flowmeter shown in FIG. 1 is indicated by a line 64. It will be evident from FIG. 6 that with the present invention the error is extremely small and can be regarded as substantially zero. In contrast thereto, with prior art electromagnetic flowmeters, the error increases with an increase in the length of the signal line. In the experiments in which the values shown in FIG. 6 were obtained, the internal diameter of flow tube 16 was 50 cm and the fluid being metered was tap water.

In the above embodiments, the signal lines between the primary and secondary are shielded. However, in cases where fluid to be metered has a low conductivity of, for example, 5 $\mu$s/cm, it is desirable that the lines between electrodes 17 and 18 and the output terminals of primary 36 are also formed by shielded cables; that is, cables 44 and 45 and external shield 37 are formed as a unitary structure.

Thus in an electromagnetic flowmeter in accordance with the invention, even if there exists an appreciable amount of capacity due to the electrical double layer of each electrode, the zero point can be stabilized to make possible measurements with a high degree of accuracy. Moreover, since the outputs of amplifiers 28 and 29 are also supplied to the shields of cables 44 and 45, a high speed response is obtained even if low frequencies such as, for example, 50/4 Hz, 60/4 Hz or 60/8 Hz are employed for excitation, for the electrical double layer of each electrode has substantially no effect thereon.

While there have been shown and described preferred embodiments of an electromagnetic flowmeter in shielded lines in accordance with the invention, it will be appreciated that many changes and modifications may be made therein without, however, departing from the essential spirit thereof.

I claim:

1. An electromagnetic flowmeter of high accuracy comprising:
   A. a primary including a flow tube through which the fluid being metered is conducted to intercept a magnetic field established by an electromagnet having a coil to induce a voltage therein which is transferred to a pair of electrodes mounted at diametrically-opposed positions on the tube, said coil being excited by a rectangular wave whose frequency is low relative to the frequency of a standard A-C power line;
   B. a secondary coupled to said primary, said secondary including a pair of input amplifiers, each having an inverting input, a non inverting input and an output;
   C. a transmission line to couple said primary to said secondary in a manner avoiding capacitive effects, said line being constituted by a pair of cables each having an inner conductor and an outer shield, the inner conductor of the cables connecting the electrodes of the primary to the respective non-inverting inputs of the amplifiers, the outer shields thereof being connected to the respective inverting inputs and outputs of the amplifiers, and a common shield surrounding said cables, and
   D. a differential amplifier coupled to the outputs of said pair of amplifiers to provide a differential output which is alternately applied by signal switching means to first and second sample-and-hold circuits during intervals when the magnetic flux in said tube is in its steady-state condition.

2. A flowmeter as set forth in claim 1, wherein said excitation current is supplied to said coil by an excitation circuit comprising a constant current source and power switching means to periodically connect said source to said coil in alternate directions.

3. A flowmeter as set forth in claim 2, further including a timing control circuit to concurrently actuate said signal switching means and said power switching means.

4. A flowmeter as set forth in claim 1, wherein said low frequency is a sub-multiple of 60 Hz.

5. A flowmeter as set forth in claim 1, wherein said transmission line has a length exceeding 100 meters.

6. A flowmeter as set forth in claim 1, wherein said fluid is potable water.

7. A flowmeter as set forth in claim 1, wherein said excitation current is supplied to said coil by an excitation circuit which includes a full-wave rectifier whose input is connected to said standard A-C power line through a switch which is periodically actuated at a low-frequency rate.

* * * * *